United States Patent
Nakamura et al.

(10) Patent No.: US 10,040,374 B2
(45) Date of Patent: Aug. 7, 2018

(54) SEAT SLIDE DEVICE

(71) Applicant: Toyota Body Seiko Co., LTD., Takahama-Shi, Aichi (JP)

(72) Inventors: Motohisa Nakamura, Takahama (JP); Shin Shiraki, Takahama (JP)

(73) Assignee: Toyota Body Seiko Co., LTD., Takahama-Shi, Aichi (JP)

( * ) Notice: Subject to any disclaimer, the term of this patent is extended or adjusted under 35 U.S.C. 154(b) by 0 days.

(21) Appl. No.: 15/325,889

(22) PCT Filed: Jul. 15, 2014

(86) PCT No.: PCT/JP2014/068800
§ 371 (c)(1),
(2) Date: Jan. 12, 2017

(87) PCT Pub. No.: WO2016/009495
PCT Pub. Date: Jan. 21, 2016

(65) Prior Publication Data
US 2017/0144569 A1 May 25, 2017

(51) Int. Cl.
*F16M 13/00* (2006.01)
*B60N 2/07* (2006.01)
*B60N 2/08* (2006.01)

(52) U.S. Cl.
CPC .............. *B60N 2/07* (2013.01); *B60N 2/0875* (2013.01)

(58) Field of Classification Search
CPC ...... B60N 2/07; B60N 2/0875; B60N 2/0818; B60N 2/08; B60N 2/0868; B60N 2/0862
(Continued)

(56) References Cited

U.S. PATENT DOCUMENTS

| 8,955,814 B2* | 2/2015 | Moriyama | ........... B60N 2/0705 248/429 |
| 2011/0233366 A1* | 9/2011 | Mizuno | ................ B60N 2/0705 248/429 |

(Continued)

FOREIGN PATENT DOCUMENTS

| JP | 10-100752 A | 4/1998 |
| JP | 2013-18439 A | 1/2013 |

OTHER PUBLICATIONS

International Search Report for International Application No. PCT/JP2014/068800, dated Oct. 7, 2014.

*Primary Examiner* — Christopher Garft
(74) *Attorney, Agent, or Firm* — Wolf, Greenfield & Sacks, P.C.

(57) ABSTRACT

There is provided a seat slide device capable of stably holding a position of an upper rail as well as a position of a seat. An upper rail (3) has an inclined section (30*d*) obliquely formed so as to approach an inner surface of a lower rail (2) as going rearward. A displacement member (32) has an abutting section (33) disposed so as to abut on the inner surface of the lower rail (2) and an inclined section (30*d*). The abutting section (33) abuts on the inclined section (30*d*) by rearward urging to the displacement member (32) by a tension coil spring (36*a*). The inclined section (30*d*) converts urging force received from a tension coil spring (36*a*) through the abutting section (33) into force in such a direction as to abut on the inner surface of the lower rail (2) to apply the force to the abutting section (33), and the abutting section (33) is made to abut on the inner surface of the lower rail (2) at a time of locking and at a time of unlocking of a lock member (5).

7 Claims, 7 Drawing Sheets (58) Field of Classification Search
USPC .......................................................... 248/429
See application file for complete search history.

(56) References Cited

U.S. PATENT DOCUMENTS

2012/0061548 A1\* 3/2012 Moriyama ........... B60N 2/0292
                                                                                   248/430
2013/0015312 A1\* 1/2013 Shiraki ................ B60N 2/0705
                                                                                   248/429

\* cited by examiner

SEAT SLIDE DEVICE

RELATED CASE INFORMATION

This application is a 371 U.S. National Stage of International Application No. PCT/JP2014/068800 filed on Jul. 15, 2014, which is incorporated by reference herein in its entirety.

TECHNICAL FIELD

The present invention relates to a seat slide device, and relates to a seat slide device having high frictional force against movement of an upper rail in one direction in the sliding direction.

BACKGROUND ART

As a seat slide device for sliding a seat, for example, Patent Literature 1 described below discloses a seat slide device for a vehicle including a lower rail fixed to a floor, an upper rail that slides with respect to the lower rail, a lock section that fixes the upper rail to the lower rail, and a movable section (abutting section) provided between the lower rail and the upper rail.

In this seat slide device, when the lock section locks the upper rail and the lower rail, the movable section abuts on a part of the upper rail and a lower rail inner surface, so that rattling of the both is regulated. On the other hand, when the lock section releases locking between the upper rail and the lower rail, the movable section is separated from the lower rail inner surface to suppress sliding resistance, so that sliding of the upper rail with respect to the lower rail is smoothly implemented.

CITATION LIST

Patent Literature

Patent Literature 1: Japanese Patent Laid-Open No. 2013-18439

SUMMARY OF INVENTION

Technical Problem

In the seat slide device described in Patent Literature 1, when the lock section releases the locking between the upper rail and the lower rail, the sliding resistance can be suppressed, so that the sliding of the upper rail with respect to the lower rail can be smoothly implemented.

However, while the sliding of the upper rail can be smoothly implemented when force in the sliding direction is applied to the upper rail at a time of unlocking, it is sometimes difficult to stably hold a position of the upper rail as well as a position of a seat fixed to the upper rail due to a stop posture of a vehicle or the like, when the force in the sliding direction is not applied to the upper rail.

The present invention has been made in view of the above problem, and an object of the present invention is to provide a seat slide device capable of stably holding a position of an upper rail as well as a position of a seat fixed to the upper rail.

Solution to Problem

The problem is solved by a seat slide device according to the present invention including: a lower rail fixed to a floor; an upper rail slidably mounted on the lower rail; a lock mechanism that locks sliding of the upper rail with respect to the lower rail; a displacement member provided between the lower rail and the upper rail, and mounted on the upper rail so as to be swingable in a sliding direction of the upper rail; and an urging member that urges the displacement member in one direction, wherein the upper rail has an inclined section obliquely formed so as to approach an inner surface of the lower rail as going in the one direction in the sliding direction with respect to the lower rail, the displacement member has an abutting section disposed so as to abut on the inner surface of the lower rail and the inclined section, the abutting section abuts on the inclined section on a side in the one direction by urging to the displacement member by the urging member, and the inclined section converts urging force received from the urging member through the abutting section into force in such a direction as to abut on the inner surface of the lower rail to apply the force to the abutting section, and the abutting section is made to abut on the inner surface of the lower rail at a time of locking and at a time of unlocking of the lock mechanism.

According to the above configuration, the abutting section abuts on the inclined section and the lower rail inner surface at the time of the locking of the lock mechanism, so that it is possible to suppress rattling of the upper rail and the lower rail.

Also at the time of the unlocking, the abutting section abuts on the inclined section and the lower rail inner surface, the urging force directed in the one direction received from the urging member through the abutting section is converted into the force in such a direction as to abut on the inner surface of the lower rail by the inclined section.

In a case where the upper rail moves in the one direction, frictional force in the direction reverse to the one direction is applied to the abutting section from the lower rail inner surface, and the abutting section tries to move to a side on which the inner surface of the lower rail and the inclined section are separated. Therefore, pressing force to the lower rail inner surface from the abutting section is suppressed, so that sliding resistance can be suppressed, and the upper rail can smoothly slide with respect to the lower rail.

On the other hand, in a case where the upper rail moves in the direction reverse to the one direction, frictional force in the one direction is applied to the abutting section from the lower rail inner surface, and the abutting section tries to move to a side on which the inner surface of the lower rail approaches the inclined section. Therefore, the pressing force to the lower rail inner surface from the abutting section is increased, so that it is possible to increase sliding resistance, and it is possible to stably hold a position of the upper rail as well as a position of a seat fixed to the upper rail.

Additionally, a plurality of the displacement members may be provided, and the inclined section provided so as to abut on each of the plurality of displacement members may be obliquely formed in such a direction as to approach the inner surface of the lower rail as going in the one direction.

According to the above configuration, the plurality of displacement members are provided, and the inclined section provided so as to abut on each of the plurality of displacement members is obliquely formed in such a direction as to approach the inner surface of the lower rail as going in the one direction, so that when the upper rail moves in the direction reverse to the one direction, it is possible to further increase force applied to the lower rail inner surface from the abutting section, and it is possible to stably hold the position of the upper rail as well as the position of the seat fixed to the upper rail.

The seat slide device may include other displacement member provided between the lower rail and the upper rail, and mounted on the upper rail so as to be swingable in the sliding direction of the upper rail, wherein the upper rail may have other inclined section obliquely formed so as to approach the inner surface of the lower rail as going in an outer direction in the sliding direction with respect to the lower rail, the other displacement member may include a first link section rotatably mounted on the upper rail, and a second link section rotatably mounted on the first link section, the first link section may be disposed so as to be able to abut on the lock mechanism, may be urged by the urging member, and may rotate against urging of the urging member, interlocking with unlocking operation of the lock mechanism, the second link section may have other abutting section disposed so as to abut on the other inclined section in the outer direction, and disposed so as to be able to abut on the inner surface of the lower rail, may move to a side reverse to such a side of the other inclined section as to approach the inner surface of the lower rail in the sliding direction of the upper rail, interlocking with the first link section that interlocks with the unlocking operation of the lock mechanism, and the other abutting section may abut on the inner surface of the lower rail by application of urging force of the urging member through the first link section, and application of converted force in such a direction as to abut on the inner surface of the lower rail by the other inclined section, at the time of the locking of the lock mechanism, and may be separated from the inner surface of the lower rail by interlocking of the second link section with operation of the first link section, at the time of the unlocking of the lock mechanism.

According to the above configuration, the seat slide device includes the other displacement member that interlocks with the unlocking operation of the lock mechanism, and when the other displacement member causes the other abutting section to move so as to abut on the inner surface of the lower rail at the time of locking, so that the abutting section can function as a rattling stopper at the time of the locking of the lock mechanism while smooth sliding of the upper rail can be implemented at the time of the unlocking of the lock mechanism. Additionally, the displacement member and the other displacement member are combined and provided, so that balance adjustment of the sliding resistance of the upper rail is facilitated.

The floor may be a floor in a vehicle, the lower rail may be mounted on the floor in the vehicle so as to be inclined upward as going to a rear side of the vehicle, and the inclined section may be inclined so as to approach the inner surface of the lower rail as going to the rear side in a front-rear direction of the vehicle.

According to the above configuration, the lower rail is mounted on the floor in the vehicle so as to be inclined upward as going to the rear side, so that in a state where force in the sliding direction is not applied, the position of the upper rail can be stably held while forward sliding of the upper rail is facilitated.

Advantageous Effects of Invention

According to the present invention, it is possible to provide a seat slide device capable of stably holding a position of an upper rail as well as a position of a seat fixed to the upper rail.

DESCRIPTION OF EMBODIMENTS

Hereinafter, seat slide devices according to embodiments of the present invention will be described with reference to the drawings.

As to First Embodiment

First, a seat slide device 1 according to a first embodiment will be described with reference to FIG. 1 to FIG. 5.

Figure 3:
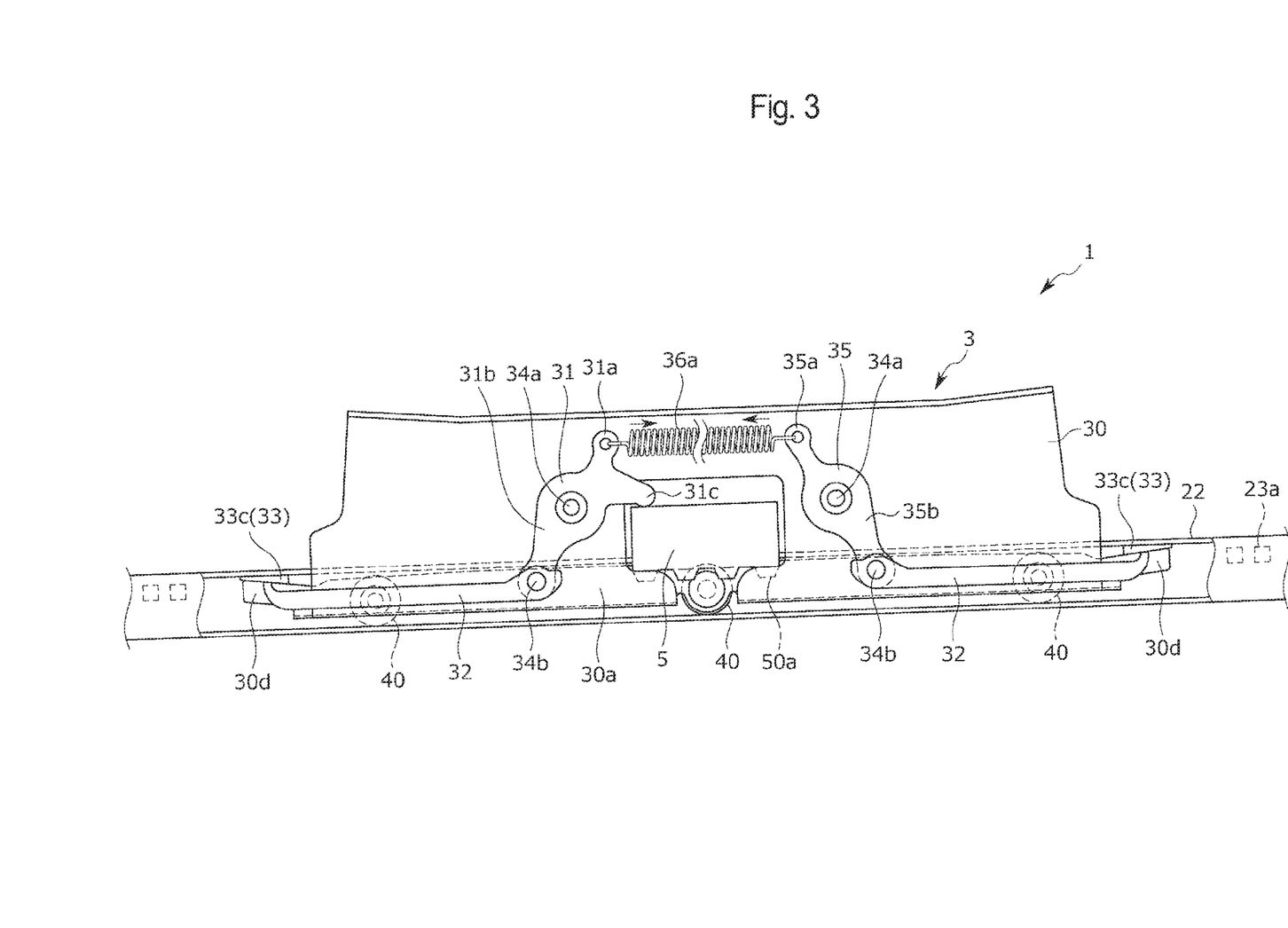
FIG. 3 is a schematically partial sectional view illustrating the locked state of the seat slide device.
Figure 4:
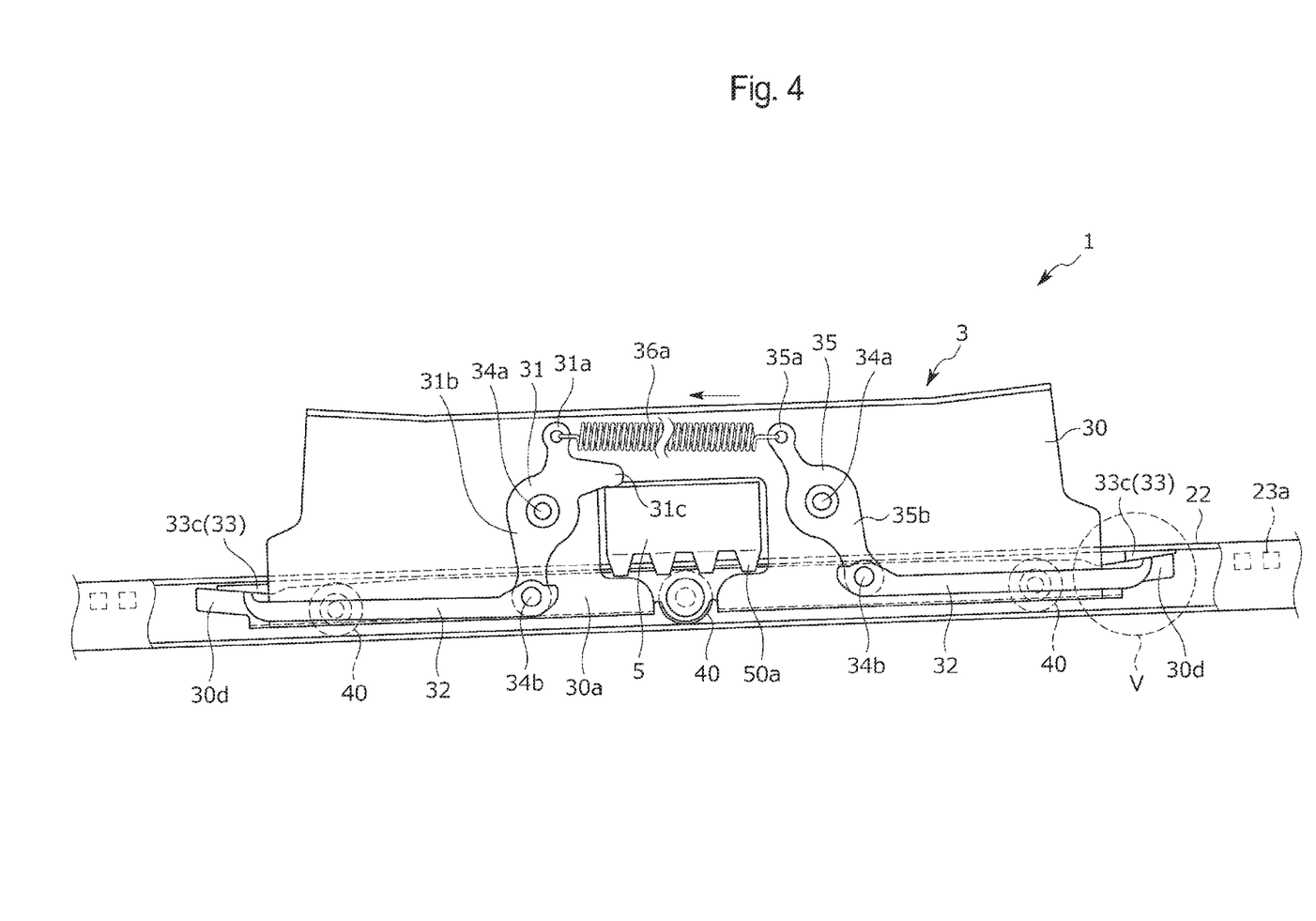
FIG. 4 is a schematically partial sectional view illustrating the unlocked state of the seat slide device.
Figure 5:
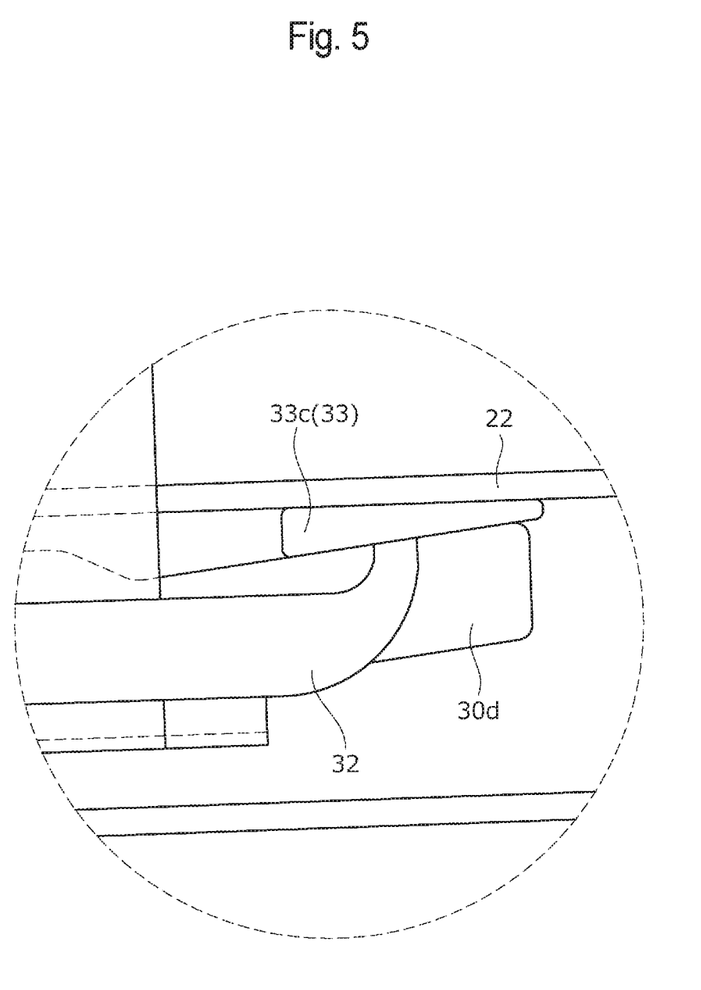
FIG. 5 is a diagram illustrating an inclined section, an upper part of the abutting section, and an inner surface of a lower rail, and an enlarged view of the III part of FIG. 4.

Herein, FIG. 1(A) is a partially cutout front view illustrating a locked state of the seat slide device 1 according to the embodiment of the present invention, FIG. 1(B) is a partially cutout plan view, FIG. 2(A) is a diagram illustrating the IIA-IIA cross-section of FIG. 1(B), and is a partially sectional view illustrating an abutting section 33 in the locked state, and FIG. 2(B) is a partially sectional view illustrating the abutting section 33 in an unlocked state. FIG. 3 is a schematically partial sectional view illustrating the locked state of the seat slide device 1, FIG. 4 is a schematically partial sectional view illustrating the unlocked state of the seat slide device 1, and FIG. 5 is a diagram illustrating an inclined section 30d, an inner part 33c of the abutting section 33, and an inner surface of a lower rail 2, and an enlarged view of the III part of FIG. 4.

The seat slide device 1 is a device provided below a seat for a vehicle (not illustrated), and includes the lower rail 2 fixed to a floor of a vehicle (not illustrated), an upper rail 3 provided slidably with respect to the lower rail 2, and a lock member 5 that locks sliding of the upper rail 3 with respect to the lower rail 2.

The lower rail 2 extends in the X direction which is the seat (vehicle) front-rear direction, and is fixed on both side in the Y direction which is the seat right-left direction orthogonal to the X direction. The lower rail 2 supports the upper rail 3 slidably in the extending direction, the upper rail 3 being inserted such that the extending direction of the upper rail is the same as the extending direction of the lower rail. Hereinafter, the X direction is also described as the front-rear direction, the Y direction is also described as the right-left direction, and the Z direction is also described as the vertical direction.

As illustrated in FIG. 2(A) and FIG. 2(B), the lower rail 2 has a bottom plate section 20, an outer plate sections 21 extending upward from both right and left ends of the bottom plate section 20, upper plate sections 22 extending from upper ends of the right and left outer plate sections 21 to the inside in right-left direction, and inner plate sections 23 extending downward from inner ends of the right and left upper plate sections 22.

A storage section 24 that is surrounded by the bottom plate section 20, the right and left outer plate sections 21, the right and left upper plate sections 22, and the right and left inner plate sections 23, and stores a lower section of the upper rail 3 described below is opened upward from a space between the right and left inner plate sections 23. The upper rail 3 is mounted such that an upper part of the upper rail 3 protrudes from a region opened between the right and left inner plate sections 23 of the lower rail 2.

Figure 1:
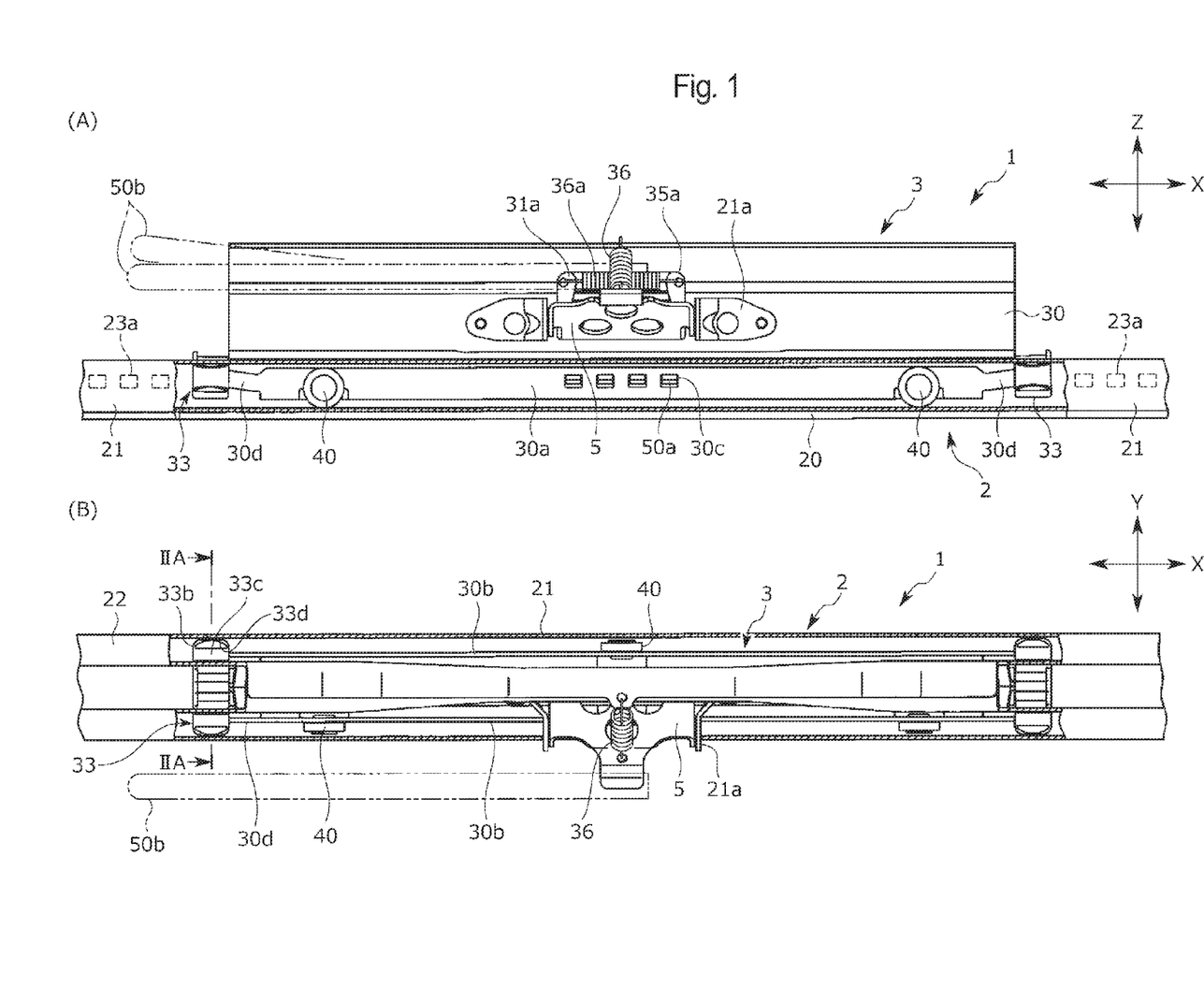
FIG. 1(A) is a partially cutout front view illustrating a locked state of a seat slide device according to an embodiment of the present invention.
FIG. 1(B) is a partially cutout plan view.

As illustrated in FIG. 1, in one of the right and left inner plate sections 23, a plurality of lock holes 23a which are a part of lock mechanism according to the present invention are intermittently formed in the X direction, and lock claws 50a of the lock member 5, described below, are engaged with these lock holes 23a.

Figure 2:
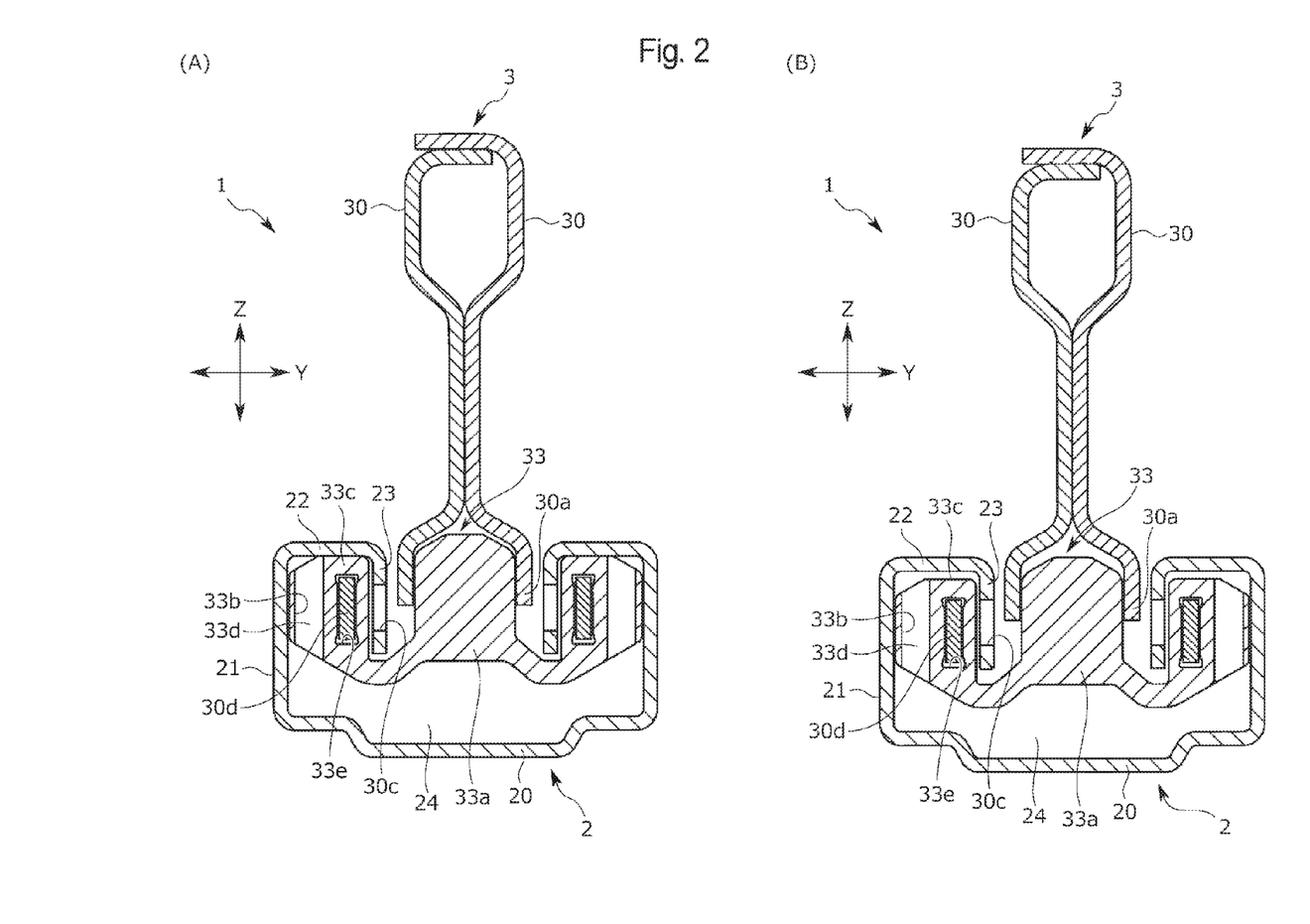
FIG. 2(A) is a diagram illustrating the IIA-IIA cross-section of FIG. 1(B), and is a partially sectional view illustrating an abutting section in the locked state.
FIG. 2(B) is a partially sectional view illustrating the abutting section in an unlocked state.

The upper rail 3 has side plates 30 extending in the X direction, and overlapped in the Y direction illustrated in FIG. 2.

In lower parts of the side plates 30, two inner parts 30a inserted into the storage section 24, and arranged at an interval in the Y direction, and outer parts 30b formed continuous to lower ends of the two inner parts 30a and bent upward and outward in the Y direction to be disposed between the outer plate sections 21 and the inner plate sections 23, illustrated in FIG. 1(B).

In the outer parts 30b, rollers 40 for sliding the upper rail 3 with respect to the lower rail 2, placed on the bottom plate section 20 inside the lower rail 2 are supported.

As illustrated in FIG. 2(A), FIG. 2(B), and FIG. 3, the inclined sections 30d extending in the X direction are formed in both ends in the X direction of each of the outer parts 30b. The inclined sections 30d are inclined upward as going toward the outside in the X direction. In other words, the inclined sections 30d are inclined so as to approach lower surfaces of the upper plate sections 22 of the lower rail 2. Herein, the inclined section 30d on the front side in the X direction is equivalent to other inclined section according to the present invention.

In the vicinity of the center in the X direction of the upper rail 3, the lock member 5 is mounted by brackets 21a mounted on one of the side plates 30.

The lock member 5 is a part of the lock mechanism according to the present invention, and has a function of locking sliding of the upper rail 3 with respect to the lower rail 2.

The lock member 5 has a plurality of the lock claws 50a. The lock claws 50a are fitted into the lock holes 23a intermittently formed in the X direction in the inner plate section 23 of the lower rail 2, so that the lower rail 2 and the upper rail 3 are locked. In the inner part 30a of the upper rail 3, a plurality of through holes 30c are formed. The lock claws 50a are inserted into these through holes 30c, so that the lock claws 50a and the lock holes 23a can be fitted to each other.

The lock member 5 is rotatably supported in the Z direction which is the vertical direction, by the brackets 21a. A tension coil spring 36 that is equivalent to an urging member according to the present invention is mounted between the upper rail 3 and the lock member 5, and the tension coil spring 36 urges the lock member 5 in such a direction as to lock the lower rail 2 and the upper rail 3.

A handle 50b is connected to the lock member 5. The handle 50b is operated, so that the lock member 5 is rotated in the Z direction against the urging of the tension coil spring 36 to be unlocked.

As illustrated in FIG. 3, in the upper rail 3, a lever 31 and a lever 35 that are respectively provided on the front side and the rear side of both sides in the X direction with the lock member 5 interposed between the levers are rotatably supported by respective support shafts 34a extending in the Y direction.

The lever 31 is equivalent to a first link section according to the present invention, and has a function of urging a displacement member 32 described below, and making the abutting section 33 formed integrally with this abut on the inner surface of the lower rail 2, and has a function of separating the abutting section 33 from the inner surface of the lower rail 2 in accordance with unlocking operation of the lock member 5.

The lever 31 has an upper arm section 31a extending above the support shaft 34a, and a lower arm section 31b extending below the support shaft 34a. A transmission section 31c protruding above the lock member 5 is integrally formed with the upper arm section 31a. The transmission section 31c has a function of engaging with the lock member 5 to transmit rotation of the lock member 5 as rotation of lever 31.

The lever 35 has a function of urging a displacement member 32 described below, and making the abutting section 33 formed integrally with this abut on the inner surface of the lower rail 2.

The lever 35 has an upper arm section 35a extending above the support shaft 34a, and a lower arm section 35b extending below the support shaft 34a. At this point, the lever 35 coincides with the lever 31. The lever 35 is different from the lever 31 in that the lever 35 does not have the transmission section 31c, and is not directly interlocked with the lock member 5.

The tension coil spring 36a which is equivalent to the urging member according to the present invention is connected between the upper arm sections 31a, 35a of the front and rear levers 31, 35.

The displacement members 32 are rotatably connected to the lower arm section 31b of the front and rear levers 31, 35 by the support shafts 34b. The displacement members 32 are disposed between the right and left inner parts 30a so as to be swingable in the X direction along the inner parts 30a of the upper rail 3. More specifically, the support shafts 34b are on the outside in the X direction below the support shafts 34a. Herein, the displacement member 32 connected to the lever 31 located on the front side configures other displacement member according to the present invention together with the lever 31.

The displacement members 32 integrally have abutting sections 33 on both ends in the X direction. The abutting sections 33 are disposed on the outside in the X direction with respect to the side plates 30.

Each of the abutting sections 33 is molded of resin, and configured from an intermediate part 33a, outer parts 33b having respective lower sides connected to intermediate part 33a and located on lateral sides of the both sides in the Y direction, and the inner parts 33c located on the upper side in the Z direction, as illustrated in FIG. 2.

Herein, the intermediate part 33a is formed so as to be movable in the X direction along the side plates 30.

Each inner part 33c is formed in order to suppress rattling of the upper rail 3 in the vertical direction by abutting on the lower surface of the upper plate section 22 of the lower rail 2. In the inner parts 33c, regulation holes 33e each having a rectangular cross-section and penetrating in the X direction are formed. Edge surfaces of the regulation holes 33e contact the inclined sections 30d passing into the regulation holes 33e, so that movement of the abutting section 33 is regulated.

The outer parts 33b are formed in order to suppress rattling of the upper rail 3 in the transverse direction by abutting on inner surfaces of the outer plate sections 21 of the lower rail 2 at the time of locking of the lock member 5. Each of the outer parts 33b is formed in an arc shape in top view so as to form a void 33d for allowing penetration in the Z direction between the inner part 33c and the outer part 33b, and extends vertically.

The inner plate sections 23 of the lower rail 2 are disposed between the intermediate part 33a, and the right and left outer parts 33b and the right and left inner parts 33c.

<Operation of Respective Members>

Now, operation of the respective members will be described with reference to FIG. 3 to FIG. 5. As to the abutting section 33, and abutting sections 63, 73 described below, illustrated in FIG. 3 to FIG. 7, only respective upper regions of the inner parts 33c, 63c, 73c are illustrated, and have shapes different from the shape of the abutting section 33 illustrated in FIG. 2. However, these are illustrated in a simplified manner in order to facilitate explanation of operation, and all actual shapes are the same as the shape of the abutting section 33 illustrated in FIG. 2 except the direction of the X direction.

(As to Lever 31)

As illustrated in FIG. 3, the lever 31 is urged by the tension coil spring 36a to be brought into a state of being rotated around the support shaft 34a, so that the abutting section 33 protrudes to the outside in the X direction through the displacement member 32 connected to the lever 31.

Therefore, as illustrated in FIG. 2(a), inner edges of the regulation holes 33e of the abutting sections 33 are pressed upward by the inclined sections 30d, the inner parts 33c abut on the right and left lower surfaces of the upper plate sections 22 which are an inner surface of the lower rail 2. Therefore, the inner parts 33c of the abutting sections 33 are brought into press contact, so that rattling of the lower rail 2 having the upper plate sections 22, and the upper rail 3 having the inclined sections 30d is suppressed.

As illustrated in FIG. 4, in the unlocked state of the lock member 5, the transmission section 31c of the lever 31 is pressed upward against elastic force of the tension coil spring 36a by the lock member 5, so that the lever 31 rotates counterclockwise around the support shaft 34a in FIG. 4. In accordance with this, load directed rearward and downward is applied to the displacement member 32 through the support shafts 34b, and the abutting section 33 retracts to the inside in the X direction through the displacement member 32.

Therefore, regulation of the inclined sections 30d to the regulation holes 33e is released, and the abutting section 33 located on the front side in the X direction moves rearward and downward along the abutting inclined sections 30d on the lower side. Then, the inner parts 33c are separated from the right and left upper plate sections 22 of the lower rail 2 in the Z direction.

Therefore, the upper rail 3 can be caused to move in the X direction with respect to the lower rail 2 in a state where the outer parts 33b of the abutting sections 33 lightly contact the inner surfaces of the outer plate sections 21 of the lower rail 2 and are separated from the upper plate sections 22 of the lower rail 2 in the Z direction in the unlocked state.

(As to Lever 35)

On the other hand, the lever 35 is not formed with the transmission section 31c, unlike the lever 31. Therefore, the lever 35 is urged in such a direction as to rotate counterclockwise in FIG. 3 by the tension coil spring 36 regardless of operation of lock member 5.

Load directed rearward in the X direction and upward is always applied to the displacement member 32 connected to the lever 35 through the support shaft 34b.

Accordingly, as illustrated in FIG. 3 and FIG. 4, the abutting section 33 located on the rear side in the X direction is urged rearward along the abutting inclined section 30d, regardless of the locked state and the unlocked state of the lock member 5.

(As to Operation of Upper Rail 3)

In a case where the upper rail 3 moves to the front side in the X direction with respect to the lower rail 2, the abutting section 33 on the rear side which is in contact with the lower surfaces of the upper plate sections 22 of the lower rail 2 tries to move rearward relative to the inclined sections 30d by frictional force received from the upper plate sections 22.

However, the inclined sections 30d are formed so as to approach the lower surfaces of the upper plate sections 22 as going rearward, and therefore movement of the abutting section 33 is restricted, and the abutting section 33 enters between the upper plate sections 22 and the inclined sections 30d like a wedge. Therefore, upward load is applied to the upper plate sections 22 through the abutting section 33.

That is, compared to a case where the abutting section 33 is completely separated from the upper plate sections 22 at the time of unlocking like the invention of Japanese Patent Laid-Open No. 2013-18439, sliding resistance in a case of movement to the front side in the X direction is increased.

On the other hand, in a case where the upper rail 3 moves to the rear side in the X direction with respect to the lower rail 2, the abutting section 33 on the rear side which is in contact with the lower surfaces of the upper plate sections 22 of the lower rail 2 tries to move forward relative to the inclined sections 30d by frictional force received from the upper plate sections 22.

Additionally, the inclined sections 30d are formed so as to be separated from the lower surfaces of the upper plate sections 22 as going forward, and therefore movement of the abutting section 33 is not restricted, and application of additional upward load to the upper plate sections 22 through the abutting section 33 is suppressed.

That is, increase in sliding resistance in a case of movement to the rear side in the X direction is suppressed.

The seat slide device 1 according to the above embodiment is easily manufactured by merely performing processing of eliminating the transmission section 31c of the lever on the rear side in the device described in Japanese Patent Laid-Open No. 2013-18439.

In a general case where the seat slide device is mounted so as to be easily slide forward in view of operability of seat movement by a seated person, forward sliding resistance is increased, so that it is possible to improve stability of a seat at the time of unlocking.

As to Second Embodiment

Now, a seat slide device 1a according to a second embodiment will be described with reference to FIG. 6. In the following description, components having the same shapes and the same functions as the components of the seat slide device 1 according to the first embodiment are denoted by the same reference numerals, and repeated description will be avoided.

Figure 6:
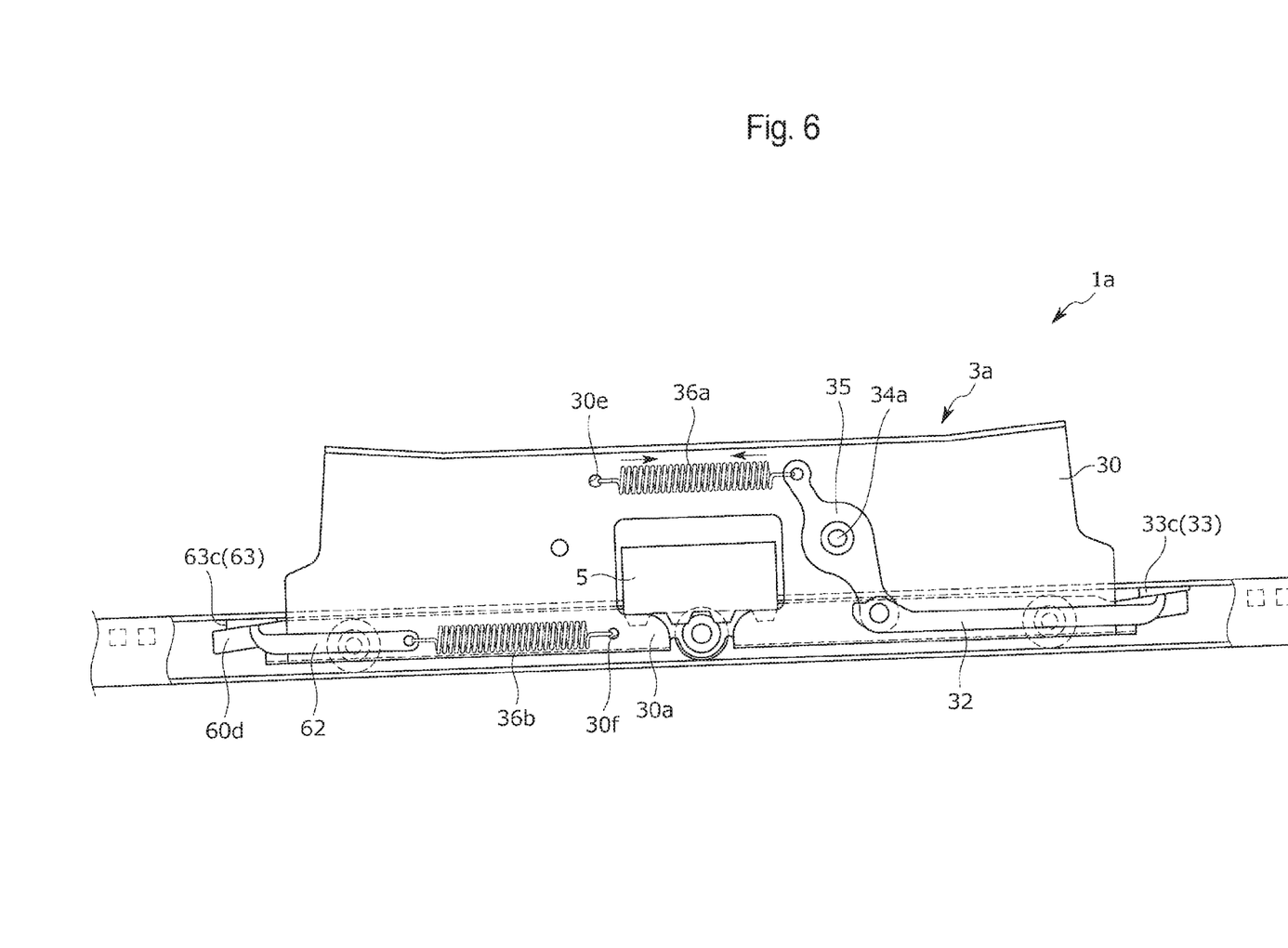
FIG. 6 is a schematically partial sectional view illustrating a seat slide device according to a second embodiment.

Herein, FIG. 6 is a schematically partial sectional view illustrating the seat slide device 1a according to the second embodiment.

The seat slide device 1a includes not only an abutting section 33 provided on the rear side in the X direction but also an abutting section 63 provided on the front side, as a member for abutting on lower surfaces of upper plate sections 22 of a lower rail 2 regardless of operation of a lock member 5.

More specifically, the seat slide device 1a includes a displacement member 62 located on the front side in the X direction and extending in the X direction, the abutting section 63 integrally formed on the front side of the displacement member 62, and a tension coil spring 36b that is connected to the rear side of the displacement member 62 and urges rearward.

The displacement member 62 does not need to link to the operation of the lock member 5, and the tension coil spring 36b is disposed on an extension in the X direction, and therefore the displacement member 62 is formed so as to have a shorter length than the displacement member 32 according to the first embodiment.

The tension coil spring 36b is equivalent to the urging member according to the present invention, and is hooked to an engaging hole 30f formed in an inner part 30a of an upper rail 3a.

The abutting section 63 abuts on upper surfaces of inclined sections 60d described below and the lower surfaces of the upper plate sections 22 of the lower rail 2 by rearward urging of the tension coil spring 36b.

The inclined sections 60d formed on front end of the upper rail 3a are inclined so as to be separated from the lower surfaces of the upper plate sections 22 of the lower rail 2 as going forward.

The inclined sections 60d are thus inclined, and the displacement member 62 is further urged rearward by a tension coil spring 36a, so that rearward force is applied to the abutting section 63 integrally formed on the displacement member 62. Therefore, an abutting state of the abutting section 63, the lower rail 2 of the upper plate sections 22, the upper rail 3a of the inclined sections 60d is maintained.

The tension coil spring 36a mounted on a lever 35 provided on the rear side in the X direction is hooked to an engaging hole 30e formed on the front side in the X direction of a support shaft 34a in a side plate 30 of the upper rail 3a, and on the upper side in the Z direction, since the lever 31 according to the first embodiment is not provided. Thus, the tension coil spring 36a is hooked to the engaging hole 30e formed in the side plate 30, so that a displacement member 32 can be urged forward through the lever 35.

Also in the seat slide device 1a thus configured, similarly to the seat slide device 1 according to the first embodiment, sliding resistance with respect to the lower rail 2 can be increased when the upper rail 3a moves to the front side in the X direction, and sliding load with respect to the lower rail 2 can be reduced when the upper rail 3a moves to the rear side in the X direction.

More specifically, in a case where the upper rail 3a moves to the front side in the X direction with respect to the lower rail 2, the abutting section 63 on the front side which is in contact with the lower surfaces of the upper plate sections 22 of the lower rail 2 tries to move rearward relative to the inclined sections 60d by frictional force received from the upper plate sections 22.

However, the inclined sections 60d are formed so as to approach the lower surfaces of the upper plate sections 22 as going rearward, and therefore movement of the abutting section 63 is restricted, and the abutting section 63 enters between the upper plate sections 22 and the inclined sections 60d like a wedge. Therefore, upward load is applied to the upper plate sections 22 through the abutting section 63.

That is, sliding resistance in a case of movement to the front side in the X direction can be increased.

On the other hand, in a case where the upper rail 3a moves to the rear side in the X direction with respect to the lower rail 2, the abutting section 33 on the rear side which is in contact with the lower surfaces of the upper plate sections 22 of the lower rail 2 tries to move forward relative to the inclined sections 30d by frictional force received from the upper plate sections 22.

Additionally, the inclined sections 30d are formed so as to be separated from the lower surfaces of the upper plate sections 22 as going forward, and therefore movement of the abutting section 33 is not restricted, and application of additional upward load to the upper plate sections 22 is suppressed.

That is, increase in sliding resistance in a case of movement to the rear side in the X direction can be suppressed.

Furthermore, upper surfaces of the abutting sections 33, 63 come into contact with the lower surfaces of the upper plate sections 22 of the lower rail 2 at the front and rear of the seat slide device 1a, and therefore sliding resistance at the time of sliding of the upper rail 3a is increased, and rattling in the front-rear direction is suppressed, so that it is possible to improve feeling of use.

As to Third Embodiment

Now, a seat slide device 1b according to a third embodiment will be described with reference to FIG. 7.

Figure 7:
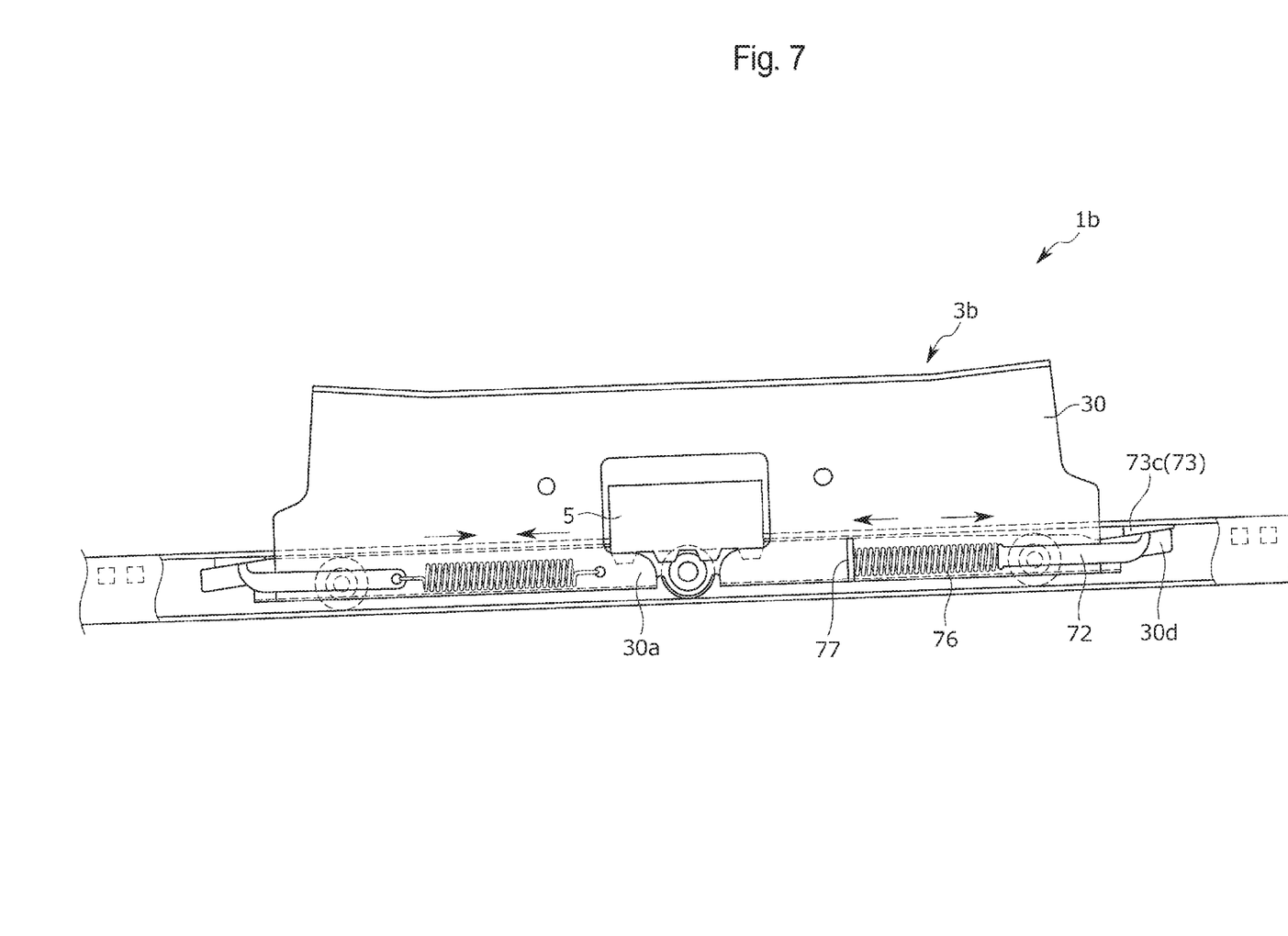
FIG. 7 is a schematically partial sectional view illustrating a seat slide device according to a third embodiment.

Herein, FIG. 7 is a schematically partial sectional view illustrating the seat slide device 1b according to the third embodiment.

The seat slide device 1b includes a displacement member 72 having substantially the same length as a displacement member 62 on the front side in place of the displacement member 32 on the rear side in the X direction of the seat slide device 1a according to the second embodiment, and a compression coil spring 76 that urges the displacement member 72 rearward.

More specifically, the seat slide device 1b includes the displacement member 72 located on the rear side in the X direction and extending in the X direction, an abutting section 73 integrally formed on the rear side of the displacement member 72, and the compression coil spring 76 connected to the rear side of the displacement member 72.

The compression coil spring 76 is disposed on an extension in the X direction, and therefore the displacement member 72 is formed so as to have a shorter length than the displacement member 32 according to the first embodiment.

The compression coil spring 76 is equivalent to the urging member according to the present invention, and has a front end which is fixed to a fixing plate 77 integrally formed on inner parts 30a of an upper rail 3b, and has a front end of the displacement member 72 which is fitted to a rear end of the compression coil spring 76. Thus, the compression coil spring 76 is fixed to the fixing plate 77 formed in side plates 30, so that the displacement member 72 can be urged rearward.

The abutting section 73 abuts on upper surfaces of inclined sections 30d and lower surfaces of upper plate sections 22 of a lower rail 2 by rearward urging of the compression coil spring 76.

Also in the seat slide device 1b thus configured, the abutting section 73 is urged to such a side of the inclined section 30d as to approach the upper plate sections 22 of the lower rail 2 by the compression coil spring 76. Therefore, in the seat slide device 1b, similarly to the seat slide device 1a according to the second embodiment, sliding resistance with respect to the lower rail 2 can be increased when the upper rail 3b moves to the front side in the X direction, and sliding resistance with respect to the lower rail 2 can be reduced when the upper rail 3b moves to the rear side in the X direction.

As described in the above embodiment, in a configuration where the displacement member 32, 62, 72 is urged to such a side of the inclined sections 30d, 60d as to narrow gaps with the upper plate sections 22 of the lower rail 2, it is possible to maintain abutting of the inclined sections 30d, 60d of the abutting section 33, 63, 73 and the upper plate sections 22. Thus, it is possible to generate frictional force between the upper rail 3, 3a, 3b and the lower rail 2.

Particularly, according to the configuration where the inclined sections 30d, 60d inclined so as to approach the upper plate sections 22 of the lower rail 2 as going to the rear side in the X direction are provided, it is possible to increase sliding resistance when the upper rail 3, 3a, 3b is caused to slide forward, and it is possible to reduce sliding resistance when the upper rail 3, 3a, 3b is caused to slide relatively rearward. Thus, as described above, the present invention is suitably widely applicable to a general slider configured so as to easily slide forward.

The seat slide devices 1, 1a, 1b according to the above embodiments are each suitably provided on a rear seat of a vehicle (not illustrated). This is because the sliding amount of the seat slide device provided in the rear seat is generally large, and such a seat slide device frequently slides, and therefore the position of the upper rail 3, 3a, 3b as well as the position of the seat fixed to the upper rail 3, 3a, 3b are highly needed to be stably held.

The seat slide device provided in the rear seat is often fixed to a floor of a vehicle forward, in order to facilitate forward seat position adjustment by a food of a seated person. Accordingly, in this case, the seat slide device is preferably configured so as to prevent forward sliding due to the weight of the seat.

In the embodiments, the seat slide devices according to the present invention are mainly described.

However, the above embodiments are merely examples in order to facilitate understanding of the present invention, and do not limit the present invention. It goes without saying that the present invention can be changed or modified without departing the spirit of the present invention, and includes an equivalent of the present invention.

For example, in each of the above embodiments, the distance in the Z direction between the inclined sections of the upper rail and the inner surface of the lower rail is changed as going rearward in the X direction, so that sliding resistance when the upper rail is caused to slide to the front side in the X direction is larger than sliding resistance in a case where the upper rail is caused to slide to the rear side. According to such a configuration, the present invention is applied to a general upper rail that slides forward by the weight of a seat at the time of unlocking, which is effective in suitable avoidance of this.

However, movement of the upper rail when force in the sliding direction is not applied to the upper rail at the time of unlocking is only needed to be avoided, and which of sliding resistance in the front direction and sliding resistance in the rear direction is increased can be suitably changed in accordance with a mounting section of the seat slide device.

The inclined sections are formed so as to approach and be separated from the lower surfaces of the upper plate sections of the lower rail in the Z direction in response to the position in the X direction, in accordance with the position in the X direction, and the abutting section that abuts on the upper sides of the inclined surfaces of the inclined section abuts on the lower side of the upper plate section. However, the present invention is not limited to such a configuration.

That is, sliding resistance to one side in the X direction and sliding resistance to the other side in the X direction only need to be make different, and the inclined sections only need to be formed so as to approach and be separated from the inner surface of the lower rail in any direction perpendicular to the X direction, in accordance with the position in the X direction.

REFERENCE SIGNS LIST 1, 1a, 1b seat slide device
2 lower rail
20 bottom plate section
21 outer plate section
21a bracket
22 upper plate section
23 inner plate section
23a lock hole (lock mechanism)
24 storage section
3, 3a, 3b upper rail
30 side plate
30a inner part
30b outer part
30c through hole
30d inclined section
30e, 30f engaging hole
31 lever (first link section, other displacement member)
31a upper arm section
31b lower arm section
31c transmission section
32 displacement member (second link section, other displacement member)
33 abutting section
33a intermediate part
33b outer part
33c inner part
33d void
33e regulation hole
34a, 34b support shaft
35 lever
35a upper arm section
35b lower arm section
36, 36a, 36b tension coil spring (urging member)
40 roller
5 lock member (lock mechanism)
50a lock claw
50b handle
60d inclined section
62 displacement member
63 abutting section
63c inner part
72 displacement member
73 abutting section 73c inner part
76 compression coil spring (urging member)
77 fixing plate

The invention claimed is:

1. A seat slide device comprising:
a lower rail fixed to a floor;
an upper rail slidably mounted in a sliding direction on the lower rail, the sliding direction including a first sliding direction and a second sliding direction opposite the first sliding direction;
a lock mechanism that locks sliding of the upper rail with respect to the lower rail;
a displacement member provided between the lower rail and the upper rail, and mounted on the upper rail so as to be swingable in the sliding direction of the upper rail; and
an urging member that urges the displacement member in one of the first and second sliding directions, wherein
the upper rail has an inclined section obliquely formed so as to approach an inner surface of the lower rail as going in the one of the first and second sliding directions with respect to the lower rail,
the displacement member has an abutting section disposed so as to abut on the inner surface of the lower rail and the inclined section,
the abutting section abuts on the inclined section on a side in the one of the first and second directions by urging to the displacement member by the urging member, and
the inclined section converts urging force received from the urging member through the abutting section into force in such a direction as to abut on the inner surface of the lower rail to apply the force to the abutting section, and the abutting section is made to abut on the inner surface of the lower rail at a time of locking and at a time of unlocking of the lock mechanism.

2. The seat slide device according to claim 1, wherein
a plurality of the displacement members are provided, and
the inclined section provided so as to abut on each of the plurality of displacement members is obliquely formed in such a direction as to approach the inner surface of the lower rail as going in the one of the first and second sliding directions.

3. The seat slide device according to claim 2, wherein the plurality of displacement members includes a second displacement member provided between the lower rail and the upper rail, and mounted on the upper rail so as to be swingable in the sliding direction of the upper rail, wherein
the upper rail has a second inclined section obliquely formed so as to approach the inner surface of the lower rail as going in an outer direction in the sliding direction with respect to the lower rail,
the second displacement member includes a first link section rotatably mounted on the upper rail, and a second link section rotatably mounted on the first link section,
the first link section is disposed so as to be able to abut on the lock mechanism, is urged by the urging member, and rotates against urging of the urging member, interlocking with unlocking operation of the lock mechanism,
the second link section has a second abutting section disposed so as to abut on the second inclined section in the outer direction, and disposed so as to be able to abut on the inner surface of the lower rail, and moves to a side reverse to such a side of the second inclined section as to approach the inner surface of the lower rail in the sliding direction of the upper rail, interlocking with the first link section that interlocks with the unlocking operation of the lock mechanism, and
the second abutting section abuts on the inner surface of the lower rail by application of urging force of the urging member through the first link section, and application of converted force in such a direction as to abut on the inner surface of the lower rail by the second inclined section, at the time of the locking of the lock mechanism, and is separated from the inner surface of the lower rail by interlocking of the second link section with operation of the first link section, at the time of the unlocking of the lock mechanism.

4. The seat slide device according to claim 1, wherein
the floor is a floor in a vehicle,
the lower rail is mounted on the floor in the vehicle so as to be inclined upward as going to a rear side of the vehicle, and
the inclined section is inclined so as to approach the inner surface of the lower rail as going to the rear side in a front-rear direction of the vehicle.

5. The seat slide device according to claim 1, further comprising
a second displacement member provided between the lower rail and the upper rail, and mounted on the upper rail so as to be swingable in the sliding direction of the upper rail, wherein
the upper rail has a second inclined section obliquely formed so as to approach the inner surface of the lower rail as going in an outer direction in the sliding direction with respect to the lower rail,
the second displacement member includes a first link section rotatably mounted on the upper rail, and a second link section rotatably mounted on the first link section,
the first link section is disposed so as to be able to abut on the lock mechanism, is urged by the urging member, and rotates against urging of the urging member, interlocking with unlocking operation of the lock mechanism,
the second link section has a second abutting section disposed so as to abut on the second inclined section in the outer direction, and disposed so as to be able to abut on the inner surface of the lower rail, and moves to a side reverse to such a side of the first inclined section as to approach the inner surface of the lower rail in the sliding direction of the upper rail, interlocking with the first link section that interlocks with the unlocking operation of the lock mechanism, and
the second abutting section abuts on the inner surface of the lower rail by application of urging force of the urging member through the first link section, and application of converted force in such a direction as to abut on the inner surface of the lower rail by the second inclined section, at the time of the locking of the lock mechanism, and is separated from the inner surface of the lower rail by interlocking of the second link section with operation of the first link section, at the time of the unlocking of the lock mechanism.

6. A seat slide device comprising:
a lower rail configured to be fixed to a vehicle floor, the lower rail including a bottom plate section configured to be mounted to the floor, an outer plate section extending upward from the bottom plate section and an upper plate section extending inward from an upper end of the outer plate section;

an upper rail slidably mounted in a sliding direction on the lower rail, the sliding direction including a first sliding direction and a second sliding direction opposite the first sliding direction;
a lock mechanism constructed and arranged to lock sliding of the upper rail with respect to the lower rail;
a first displacement member provided between the lower rail and the upper rail, the first displacement member constructed and arranged to be swingable in the sliding direction of the upper rail; and
an urging member that urges the first displacement member in one of the first and second sliding directions, wherein
the upper rail includes a first inclined section configured and arranged to approach an inner surface of the upper plate section of the lower rail as going in the one of the first and second sliding directions relative to the lower rail,
the first displacement member includes a first abutting section configured and arranged to abut the first inclined section and the inner surface of the upper plate section at a time of locking and at a time of unlocking of the lock mechanism, the first abutting section configured and arranged to transmit an urging force received from the urging member to the inner surface of the upper plate section of the lower rail.

7. The seat slide device according to claim 6, further comprising
a second displacement member provided between the lower rail and the upper rail, and mounted on the upper rail so as to be swingable in the sliding direction of the upper rail, wherein
the upper rail has a second inclined section configured and arranged to approach the inner surface of the upper plate section as going in an outer direction in the sliding direction relative to the lower rail,
the second displacement member includes a first link section rotatably mounted on the upper rail, and a second link section rotatably mounted on the first link section,
the first link section is arranged to be able to abut on the lock mechanism, is urged by the urging member, and rotates against urging of the urging member, interlocking with unlocking operation of the lock mechanism,
the second link section has a second abutting section configured and arranged to abut the second inclined section in the outer direction, and disposed so as to be able to abut on the inner surface of the upper plate section, and moves to a side reverse to such a side of the first inclined section as to approach the inner surface of the upper plate section in the sliding direction of the upper rail, interlocking with the first link section that interlocks with the unlocking operation of the lock mechanism, and
the second abutting section configured and arranged to abut the inner surface of the upper plate section by application of urging force of the urging member through the first link section, and application of converted force in such a direction as to abut on the inner surface of the upper plate section by the second inclined section, at the time of the locking of the lock mechanism, and is separated from the inner surface of the upper plate section by interlocking of the second link section with operation of the first link section, at the time of the unlocking of the lock mechanism.

* * * * *